INVENTORS
ARTHUR H. MONES
KENNETH E. NEISSER JR.

BY Joseph C. Redmond, Jr.

ATTORNEY

FIG. 6
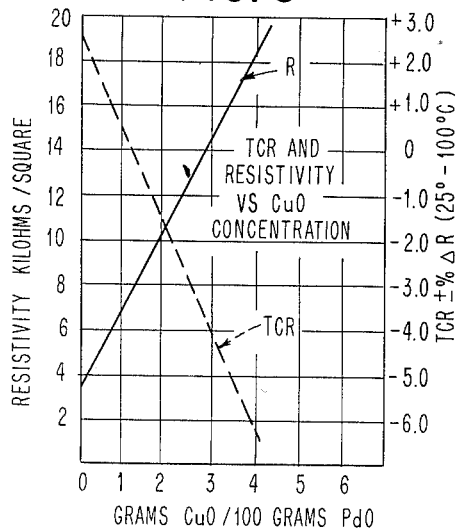
TCR AND RESISTIVITY VS CuO CONCENTRATION
FIG. 5
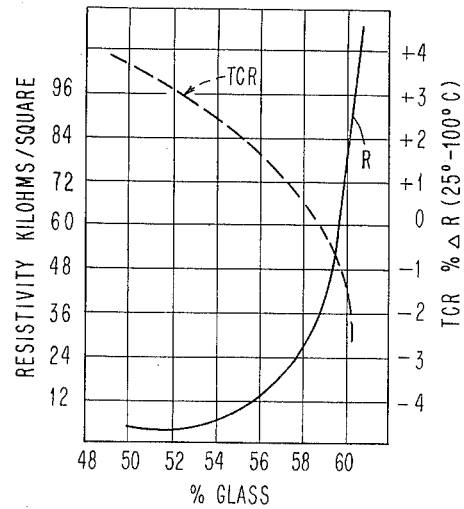
FIG. 7
| ELEMENTS | % OPER | % PREF | % OPER | % PREF | % OPER | % PREF | % OPER | % PREF | % OPER | % PREF |
|---|---|---|---|---|---|---|---|---|---|---|
| PdO | 15-70 | 18-60 | 15-70 | 18-60 | 15-70 | 18-60 | 15-70 | 18-60 | 15-70 | 18-60 |
| Ag | 0-35 | 0-22 | 0-35 | 0-22 | 0-35 | 0-22 | 0-35 | 0-22 | 0-35 | 0-22 |
| GLASS | 35-70 | 40-60 | 35-70 | 40-60 | 35-70 | 40-60 | 35-70 | 40-60 | 35-70 | 40-60 |
| $Sb_2O_3$ | 0-10 | 2-6 | | | | | | | | |
| $Li_2CO_3$ | | | 0-50 | 0-15 | | | | | | |
| $MoO_3$ | | | | | 0-5 | 0-3 | | | | |
| Cr ACETATE | | | | | | | 0-10 | 2-8 | | |
| CuO | | | | | | | | | 0-6 | 0-1.5 |
| COMPOSITION NO. | % GLASS | % Ag | % PdO | GRAMS DOPANT/ 100 PdO GRAMS | R/SQ OHMS | TCR ppm/°C |
|---|---|---|---|---|---|---|
| 1 | 70 | 10 | 20 | NONE | 25K | 1000 |
| 2 | 60 | 19 | 21 | 6.3 $Sb_2O_3$ | 25K | -60 |
| 3 | 50 | 0 | 50 | 4 $Sb_2O_3$ | 30K | +120 |
| 4 | 60 | 21 | 19 | NONE | 120 | +360 |
| 5 | 60 | 21 | 19 | 1.03 $Li_2CO_3$ | 60 | ±20 |
FIG. 8

United States Patent Office 3,248,345
Patented Apr. 26, 1966

3,248,345
ELECTRICAL RESISTANCE COMPOSITIONS, ELEMENTS AND METHODS OF MAKING SAME
Arthur H. Mones and Kenneth E. Neisser, Jr., Poughkeepsie, N.Y., assignors to International Business Machines Corporation, New York, N.Y., a corporation of New York
Filed Oct. 1, 1963, Ser. No. 313,032
14 Claims. (Cl. 252—514)

This invention relates to electrical resistor compositions, elements and methods of making same. More particularly, this invention relates to granular resistance compositions which may be bonded to suitable substrates to form resistor elements, and methods of making same.

Granular resistor compositions usually comprise a conductive powdered material and a suitable powdered insulating material. The conductive material is metallic in characteristic. One powdered insulating material found to be successful in granular resistance compositions and elements is glass and the like which is added to improve bonding of the conductive metal to a substrate which may be ceramic-like in characteristic. Resistivity of these compositions (hereinafter referred to as metal-glaze compositions and elements) is usually controlled by modification of the glaze in the composition or by the addition of noble metals, for example, silver. Presently, some metal-glaze compositions consist primarily of glass wherein the concentration is approximately 85% or higher. Resistivity is altered by the amount of glass in the composition. Another method of changing resistivity in metal-glaze compositions is by the addition of inert materials, for example, aluminum oxide which act to dilute the system. Still other methods of modifying resistivity in these compositions or systems have added metal stannates and antimonates to effect a resistivity variation. The high glass content and foreign materials in these metal-glaze systems, however, tend to establish a high distributive capacitance which is detrimental from a frequency standpoint. Nonconducting regions are introduced into these resistor systems and tend to establish high electric field buildup with resulting resistor instability under load conditions. Additionally, the presence of excess foreign metals, i.e., silver, permits migration under the influence of an electric field with resulting variations in resistivity. Further, the temperature coefficient of resistivity (TCR) is usually strongly influenced, sometimes adversely, by varying either the glass or the amount of foreign metal in these systems. Manifestly, resistors fabricated with the technology presently available are not acceptable for present day information handling systems which function at switching speeds in the order of kilomegacycles. It is desirable, therefore, to develop resistor compositions, elements and methods of making same which overcome the limitations previously described to satisfy the requirements of present day and future information handling systems thereby making such systems more readily available to the commercial, governmental and scientific communities.

A general object of the invention is a resistor composition and element which has a wide range of resistivities and excellent TCR properties.

One object is a metal-glaze resistor composition and element that may be varied in resistivity without developing large nonconducting regions.

Still another object is a resistor composition and method of making same which facilitates the fabrication of resistor elements by graphic arts processes.

A specific object is a metal-glaze resistor composition and method of making same which does not introduce excess foreign metal into the resistor system.

Another specific object is a conductive material for a resistor composition whereby the conductive material may be treated to provide a wide change in resistivity without detrimental effects to the TCR properties of the final resistor element.

According to the present invention, a metal-glaze composition has a conductive element selected to be a P-type semiconductor material, typically the oxide form of the semiconductor. As a semiconductor, the material is doped with elements of particular valence to adjust the resistivity thereof. Depending upon their valence with respect to the valence of the host semiconducting compound, the addition of dopants can either increase or decrease resistivity of the semiconductor and thereby that of the metal-glaze system. Dopants with higher valence numbers than the host P-type semiconductor cation can increase the resistivity of the conductive material. Dopants having a valence corresponding to the host lattice can increase resistivity by filling vacancies. Dopants of lower valence can decrease the resistivity of the conductive material. Increasing the percentages of dopants in the conductive element increases or lowers the resistivity thereof according to the dopant selected. Alternatively, the quantity of doped conductive element may be held constant and the insulating or glass material varied to alter the resistivity of the final resistor element.

The criteria for successful doping is rapid diffusion of the dopant and compatibility with respect to the size and binding in the lattice of the semiconductor. In order for the dopant to enter properly the lattice, it is desirable for the dopant to have a melting or decomposition temperature which is lower than that of the semiconductor for rapid reaction purposes. As another consideration, the dopant should have an ionic radius spacially suitable and bonding compatibility in the lattice. Materials having semiconductor characteristics which have been found to be suitable for the present invention as conductive elements are palladium oxide and the like.

Dopants which have been found to be suitable for the selected semiconductors are antimony, molybdenum, chromium, copper, lithium and sodium.

In a preferred embodiment of the present invention palladium metal of high purity is oxidized at 750–800° C. for approximately one hour to form the semiconductor palladium oxide. For increased resistivity, a dopant, typically antimony oxide, of high quality and in powdered form is added to the palladium oxide. The mixture is milled for approximately a half hour and fired at 750–800° C. for approximately an hour. The antimony enters the lattice of the semiconductor to alter the resistivity in a manner to be described hereinafter. The doped palladium oxide is combined with glass frit and milled for approximately two hours to form a pigment that may be combined with an inert vehicle for screening on a suitable substrate. The substrate and screened composition are dried and thereafter fired at a temperature of the order of 800° C. for approximately twenty minutes. The resulting resistor has resistivities of the order of 50 or less ohms per square to fractional megohms per square, depending upon the doping and glass quantities.

The foregoing and other objects, features and advantages of the invention will be apparent from the following more particular description of preferred embodiments of the invention, as illustrated in the accompanying drawings.

In the drawings:

FIGURE 5 is a graph of resistivity per square and TCR for a composition including palladium oxide doped with antimony, glass and silver versus the percentage of glass in the composition.

FIGURE 6 is a graph of resistivity per square and TCR for a palladium oxide, silver and glass versus grams of cupric oxide in palladium oxide.

FIGURE 7 is a chart of operable and preferred proportions of elements in the present invention.

FIGURE 8 is a chart of variations in resistivities and TCR's for particular compositions.

Figure 1:
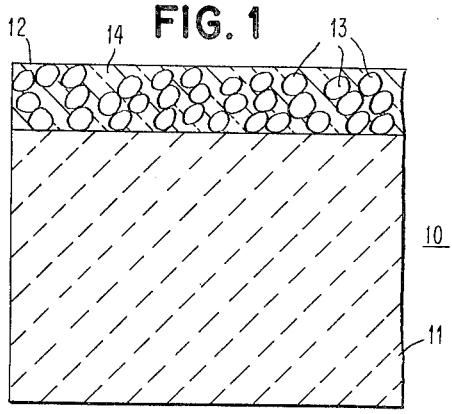
FIGURE 1 is a sectional view to a greatly enlarged scale of a portion of an electrical resistance element in accordance with the present invention.

*Electrical resistance element of FIGURE 1*

An electrical resistance element 10 in accordance with the present invention includes an electrically nonconducting base 11 of a suitable material such as a ceramic having fired thereon a thin layer 12 of a particular resistance composition. The resistance composition comprises a quantity of finely divided material from the group consisting of palladium oxide 13 and rhodium oxide. Each of the elements, i.e., palladium oxide and rhodium oxide is regarded as being semiconductive in nature as indicated in any well-known chemical handbook. Each semiconductor element may be doped with a univalent, divalent or multivalent cation taken from the group comprising antimony, chromium, molybdenum, copper, lithium and sodium in a manner to be described hereinafter. The composition additionally includes parts of finely divided glass 14 which may be lead borosilicate or the like. The glass may also include a finely divided conductive material of noble metal, i.e., silver, gold or like, which aids in adjusting the resistivity of the final resistor element.

*Conductor element doping*

Before describing the preferred details of the invention and the ranges of the various elements, it is believed in order to describe the effect of doping a semiconductive material with univalent, divalent and multivalent cations for purposes of controlling resistivity. Resistivity changes in the semiconductor PdO are clearly attributable to the effects of doping as demonstrated by the following conductivity measurements of sintered pellets of doped PdO without extraneous materials such as glass or silver:

|   | Semi-conductor | Percent Dopant | Resistivity |
| --- | --- | --- | --- |
| a | PdO | None | $0.9\Omega$ cm./$25°$ C. |
| b | PdO | 1% $Li_2CO_3$ | $9 \times 10^{-2} \Omega$ cm./$25°$ C. |
| c | PdO | 4% $Sb_2O_3$ | $29\Omega$ cm./$25°$ C. |

Figure 2:
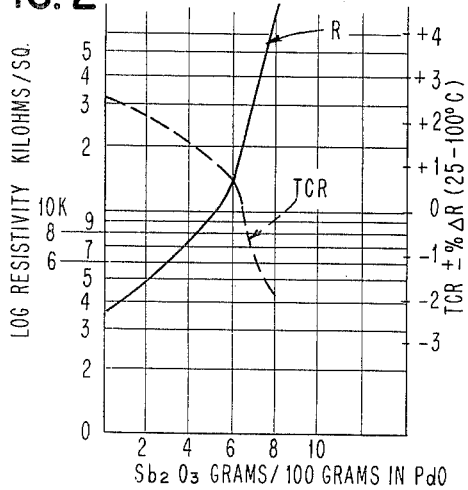
FIGURE 2 is a semilogarithmic plot of resistivity per square and TCR for a palladium oxide, silver and glass composition versus grams of antimony oxide added per 100 grams of palladium oxide.

Referring to FIGURE 2, the change in resistivity and TCR is indicated for a metal-glaze composition comprising a conductive element of silver and palladium oxide in a 0.9 metals ratio, the silver and palladium oxide representing 40% of the composition and the remainder being a commercially available glass. Prior to combination with the silver and glass the palladium oxide is doped with antimony oxide. The antimony oxide is indicated in FIGURE 2 as being a particular number of grams with respect to 100 grams of palladium oxide. For example, 0.6 gram of antimony oxide is added to 10 grams of palladium oxide by milling together for approximately half an hour. This mixture is equal to 6 grams of $Sb_2O_3$ per 100 grams of PdO in FIGURE 2. Next, the mixture is fired in air at a temperature between 750–800° C. for one hour. The ionic radius of Pd II is 0.80 A. The ionic radii of Sb III and Sb V are 0.90 and 0.62 A., respectively, which makes these elements compatible in PdO. Antimony oxide has a melting temperature of the order of 650° C. Palladium oxide has a decomposition temperature of about 800° C. in air. Accordingly, the antimony oxide enters the palladium oxide lattice and adjusts the resistivity in proportion to the amount of antimony oxide added. A study of controlled valence in semiconductors is described in the literature, for example, Phillips Research Reports, Volume 5, 1950, pp. 173–187, by E. J. W. Verwey. Based on related theory to that disclosed in the Phillips Research reports the present invention has found that Sb III clearly decreases carrier concentration in the semiconductor. Li I on the other hand clearly increases carrier concentration as will appear hereinafter. The effect of lattice substitutional doping by controlling valency is not always predictable, however. Further, doping can occur by interstitial rather than by a substitutional mode which further complicates the doping effect. The effect of doping on TCR is even less predictable than resistivity. It appears that conductivity in palladium oxide is controlled by lattice site to lattice site hole jumping which is similar to the phenomenon described in an article appearing in the "Journal of Chemical Physics," Volume 26, 1957, page 582, by R. R. Heikes and W. D. Johnston. The hole jumping in turn is associated with an activation energy. The activation energy describes a minimum in a temperature versus resistance curve which would produce positive and negative TCR's depending upon where the minimum occurs. The activation energy can be and evidently is altered by the substitution of cations, i.e., antimony, copper, molybdenum, lithium, chromium and sodium in palladium oxide such that TCR's referred to 25° C. are driven positive with ions that decrease resistivity whereas ions that increase resistivity drive the TCR negative. For a small range of lithium concentration, this TCR characteristic is reversed as will appear hereinafter. TCR and resistivity are further complicated by the glass, silver and palladium alloys in the system which appear to provide a metal phase as well as dope the palladium oxide. Although resistivity and TCR changes have been described for doping the palladium oxide with cations, it is also possible to effect these characteristics by substitution for the anions and the lattice. For example, a fluoride or a chloride may be substituted for the oxide to alter resistivity. It is usually more advantageous, however, to control the system by cation substitution. It will be noted from FIGURE 2 that as the resistivity of the doped semiconductor material increases, the TCR decreases or falls in a negative direction. This feature is particularly attractive for resistance elements desired to have relatively high resistivities since such undoped compositions usually have an accompanying large positive TCR. The negative TCR effect of antimony counteracts the inherently high positive TCR which produces a final resistor of excellent TCR properties. Thus, antimony oxide, which has usually been regarded as (1) improving contact resistance, or (2) a fining agent in covering a glass member to form a resistor, may now be employed to adjust the resistivity of P-type semiconductors, typically PdO, and alter the TCR of the final resistor in a negative direction.

Figure 3A:
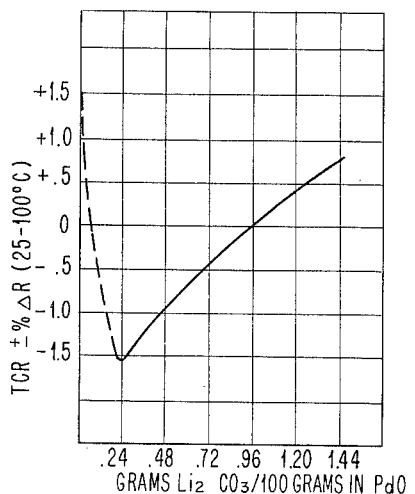
FIGURE 3A is a graph of TCR for a palladium oxide, silver and glass composition of relatively low resistivity per square versus grams of lithium concentration as lithium carbonate in palladium oxide.
Figure 3:
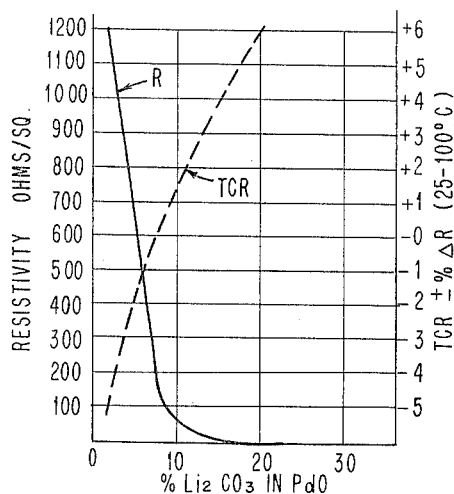
FIGURE 3 is a graph of resistivity per square and TCR for a palladium oxide, silver and glass composition versus percent lithium carbonate added to the palladium oxide.

Referring to FIGURE 3, a univalent cation, i.e., lithium, is employed as a dopant for palladium oxide to alter the resistivity and the TCR of a final resistor element. The resistance composition is substantially the same as that described in connection with FIGURE 2 except a quantity of lithium different from that of the antimony oxide is employed with the palladium oxide. The palladium oxide is doped with lithium by procedures similar to that described for the antimony oxide. FIGURE 2 indicates that the resistivity of a resistor decreases substantially with respect to the quantity of lithium added to the palladium oxide. TCR increases positively as the lithium doping is increased. For low resistivity per square, however, as indicated in FIGURE 3A, the TCR initially falls in a negative direction for a particular interval of lithium addition and thereafter reverses and increases in a positive direction. This characteristic of lithium is particularly advantageous for resistor compositions having resistivities of the order of 100 ohms per square. Laboratory investigation reveals that metal-glaze compositions about 100 ohms per square have relatively large positive TCR's in the PdO system. The addition of lithium to the PdO in the proportions indicated in FIGURE 3A, however, counteracts these inherent high positive TCR over a small resistivity range and produces final resistors having essentially zero TCR's.

Figure 4:
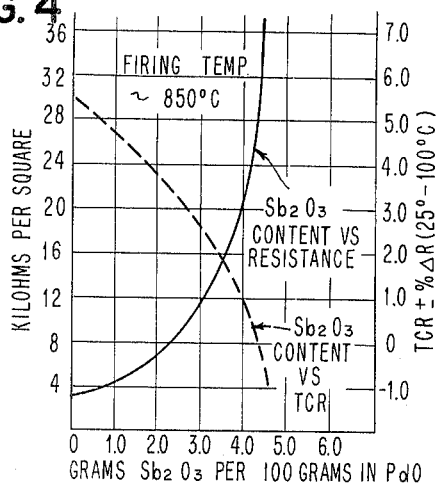
FIGURE 4 is a graph of resistivity per square and TCR for a palladium oxide and glass composition versus grams of antimony oxide added per 100 grams of PdO.

FIGURE 4 discloses the variation of resistivity in a metal-glaze composition of PdO doped with antimony oxide but without silver or other extraneous noble metals for adjusting resistivity. FIGURE 4 verifies that doping the semiconductive element alone is sufficient to obtain a desired resistivity and TCR characteristics for a metal-glaze element.

Other multivalent cations which have been employed in the present invention are chromium and molybdenum. Each of these elements alters resistivity but has a different effect on TCR. Chromium changes the TCR of a palladium oxide, silver and glass composition much like antimony. Molybdenum has been found to increase TCR in a positive direction as contrasted with antimony oxide which drives TCR in a negative direction. Molybdenum, however, decreases resistivity. Each of the multivalent cations, however, may be selected in a preferred range to provide a desired resistivity and TCR effect. Alternatively, the multivalent elements may be employed in combination to realize desired resistor characteristics. The divalent cation copper increases resistivity due to filling PdO vacancies. The univalent cation sodium operates in a related manner to lithium. Thus, FIGURES 2 and 3 demonstrate that the resistivity of metal-glaze resistors is controlled without the need for adding extraneous elements, i.e., silver and the like or additional glass to the entire mixture. Instead, the conductor element of a metal-glaze composition is selected to be a P-type semiconductor which is doped with various cations to obtain a desired resistivity and TCR characteristic.

Composition preparation

The following methods are given as suitable methods for preparing metal-glaze resistor compositions. These methods, however, are not to be taken as limitive of the invention, other methods being equally applicable to the production of metal-glaze compositions.

The doped palladium oxide and a glass having particle size about 35 microns are mechanically mixed in any convenient manner. Glass type has been found to effect the TCR and resistivity of the system, all other materials being consistent. For the particular resistivity chosen, a lead borosilicate glass or the like has been found suitable. Next, the glass and palladium oxide are preferably mixed with a suitable inert liquid vehicle so as to form a viscous mixture of paste. The liquid vehicle may be glycerine or an organic solvent such as pine oil. Mixing and wetting techniques as related to the mixture similarly affect TCR and resistivity properties and must be consistently and carefully controlled to realize good reproducibility. Any mixing technique may be used but it must be consistently followed. The viscous mixture is formed into a film on the ceramic base 11 by a suitable graphic art technique, such as silk screening. The thickness of the deposited film is of the order of .001 inch. The structure thus formed is mildly heated to an intermediate temperature, such as about 110° C. to drive off or volatilize the vehicle thus leaving a dry film on the ceramic base 10. Next, the structure is fired in an oven at a higher temperature, such as one in the range of 800° C. for a period of about twenty minutes and is then removed from the oven. Preferably, the structure is slowly cooled over a period such as about thirty minutes. Alternatively, the cooling may be accomplished quickly in about two minutes. The selected high temperature is determined in part by the softening temperatures of the finely divided glass which is employed in the viscous mixture. The final resistor film thickness is about .0007 inch.

The film 12 which is established on the ceramic base 11 has a structure similar to that represented diagrammatically in FIGURE 1. A distribution of the doped palladium oxide particles 13 in the glass matrix 14 is deemed to be such that the film 12 has a resistivity which is dependent upon the relative proportion of the doped palladium oxide in the glass.

Referring to FIGURE 5, the graph indicates changes in resistivity of a metal-glaze composition for varying percentages of glass. The composition comprises palladium oxide and silver in a 0.90 metals ratio and a commercially available glass. The palladium was doped with 8.16 grams of antimony oxide per 100 grams of palladium oxide. Initially the mixture was 50% glass and 50% doped palladium oxide and silver. As the quantity of glass in the mixture increased, the resistivity also increased. The TCR of the mixture descended in a negative direction. A resistivity of 40K ohms per square produces a substantially zero TCR. Thus, it is believed the resistivity of the film 12 is conveniently altered by changing the glass and doped palladium oxide ratio as well as solely varying the percentage of dopant in the palladium oxide.

The following examples are given to illustrate certain preferred details of the invention, it being understood that the details of the examples are not to be taken as in any way limiting the invention thereto. In all examples the materials are applied to a substrate by conventional graphic arts processes, typical screen deposition. The TCR for each composition is in the range of 25 to 100° C.

Example 1

Finely divided palladium black is oxidized at approximately 750° C. in air for about one hour. To the palladium oxide is added 6 grams of antimony oxide per 100 grams of oxidized palladium. The mixture is milled for approximately one hour and fired at about 750° C. in air. The resulting palladium oxide doped with antimony is added as the remainder to a composition including 19% silver and 60% lead borosilicate glass. The composition is mixed for about a two-hour interval. A vehicle, typically B terpineol, is added to facilitate screen deposition. The deposited composition is dried and subsequently fired at about 800° C. to produce resistors having 15 kilohms per square resistivity and a TCR of about 100 p.p.m. per degree C.

Example 2

Finely divided palladium black is oxidized as described in Example 1. The oxidized palladium black is mixed with 4 grams antimony oxide per 100 grams palladium oxide. The mixture is milled and fired at about 750° C. in air. A composition is prepared including in equal quantities of palladium oxide doped with antimony and a lead borosilicate glass. The composition is mixed for a two-hour interval and distributed in an organic vehicle. The composition solid content is approximately 80% for screen deposition on a suitable substrate. The deposited composition is dried and subsequently fired at about 800° C. The final resistor has a resistivity of the order of 30 kilohms per square and a positive TCR of approximately 120 p.p.m. per degree C.

Example 3

Finely divided palladium previously sintered in a reducing atmosphere at about 400° C. is oxidized at approximately 750° C. in air for about one hour. The oxidized palladium is mixed with lithium carbonate in the ratio of 1.8 grams of lithium per 100 grams of palladium oxide. The combination of lithium carbonate and palladium oxide is fired at about 800° C. The resulting palladium oxide doped with lithium is combined with other elements to form a composition comprising 19% lithium doped palladium oxide, 21% silver and 60% glass. The composition is distributed in an organic vehicle, the solid content of the composition being approximately 80% to facilitate screen deposition. The deposited resistor is fired at about 800° C. to form resistor elements having resistivities of the order of 50 ohms per square and a TCR of 80 p.p.m. per degree C.

*Example 4*

Finely divided palladium black is oxidized as described in Example 1. The oxidized palladium black is mixed with 0.79 gram of cupric oxide per 100 grams of palladium oxide. The procedure thereafter is the same as that described in Example 1. The deposited resistor has resistivity of the order of 6 kilohms per square and a TCR of about 75 p.p.m. per degree C. The particular characteristics of copper or divalent dopants are indicated in FIGURE 6.

*Composition ranges*

While innumerable combinations of materials may be used in making the resistor composition and element of the present invention, FIGURE 7 sets out as being illustrative, the range of mixtures which is intended that this invention cover.

FIGURE 8 indicates the variation in resistivity and TCR for particular compositions. Composition 1 has a TCR (−) 1000 p.p.m. per degree C with the presence of glass, silver and undoped palladium oxide. Alternatively, doping with antimony as shown in composition 2, provides a similar resistivity with a more desirable TCR. Composition 3, which contains no silver and antimony doped PdO, again provides resistivity comparable to the composition with a more desirable TCR. Compositions 4 and 5 indicate the differences between low resistivity compositions which are undoped and doped with lithium, respectively. Manifestly, the doped composition 5 has improved characteristics from a TCR standpoint than the undoped composition 4.

Throughout the examples where silver is used, it can be replaced wholly or partially with either gold or platinum or both with similar results, and where palladium oxide is used, it can be replaced wholly or in part by rhodium oxide.

According to the present invention, therefore, resistance films having resistivities from less than 50 ohms per square to 500 kilohms per square have been produced with excellent TCR characteristics. The percentage of glass in the composition is in all cases less than 70%. Accordingly, the distributive capacitance of the final resistor is relatively low as compared to prior art devices. A relatively low glass concentration in a resistor eliminates the problem of non-conducting regions with resulting high electric field buildup. The composition does not require silver or other noble metals to alter the resistivity. The elimination of the silver in the composition eliminates the conductor particle drift with resultant load instability. Thus, the present invention has provided a resistance composition element and method of making same which has the necessary characteristics for use in present day and future information handling systems.

Throughout the specification and claims, any reference to parts, proportions and percentages referes to parts, proportions and percentages by weight unless otherwise specified.

While the invention has been particularly shown and described with reference to preferred embodiments thereof, it will be understood by those skilled in the art that various changes in form and details may be made therein without departing from the spirit and scope of the invention.

What is claimed is:
1. An electrical resistor composition adapted to be applied to and fired on an electrically nonconductive ceramic base consisting essentially of
   30% to 50% finely divided P-type semiconductor in the oxide form taken from the group consisting of palladium and rhodium, as a conductive element,
   said P-type semiconductor doped with up to 15% by weight of a cation taken from the group consisting of antimony, chromium, lithium and sodium,
   and 50% to 70% finely divided borosilicate glass frit.
2. An electrical resistor composition adapted to be applied to and fired on an electrically nonconductive ceramic base consisting essentially of
   15% to 70% finely divided P-type semiconductor in the oxide form taken from the group consisting of palladium oxide and rhodium oxide, as a conductive element,
   said P-type semiconductor oxide doped with up to 15% by weight of a cation taken from the group consisting of antimony, chromium, lithium and sodium,
   0% to 35% of finely divided metal taken from the group consisting of silver, gold and platinum, as a conductive element,
   a total of 35% to 70% of said conductive element, and 30% to 65% finely divided borosilicate glass frit.
3. An electrical resistor composition adapted to be applied to and fired on an electrically nonconducting base comprising
   15% to 70% finely divided P-type semiconductor in the oxide form taken from the group consisting of palladium oxide and rhodium oxide, as a conductive element,
   said P-type semiconductor oxide doped with up to 10% by weight of the oxide of a multivalent cation taken from the group consisting of antimony and chromium,
   0% to 35% finely divided metal taken from the group consisting of silver, gold and platinum, as a conductive element,
   a total of 35% to 70% of said conductive element and 30% to 65% finely divided borosilicate glass frit.
4. An electrical resistor composition adapted to be applied to and fired on an electrically nonconducting base comprising
   15% to 70% finely divided P-type semiconductor in the oxide form taken from the group consisting of palladium oxide and rhodium oxide, as a conductive element,
   said P-type semiconductor oxide doped with up to 15% by weight of the oxide of a univalent cation taken from the group consisting of lithium and sodium,
   0% to 35% finely divided metal taken from the group consisting of silver, gold and platinum, as a conductive element,
   a total of 35% to 70% of said conductive element, and 30% to 65% finely divided borosilicate glass frit.
5. An electrical resistor composition adapted to be applied to and fired on an electrically nonconductive ceramic base consisting essentially of
   30% to 50% finely divided P-type semiconductor in the oxide form taken from the group consisting of palladium oxide and rhodium oxide,
   said P-type semiconductor oxide doped with up to 10% by weight of multivalent cations, cations selected from the group consisting of antimony and chromium, and 50% to 70% finely divided borosilicate glass frit.

6. An electrical resistance element comprising
an electrically nonconducting ceramic base having fired thereon a layer of resistance composition comprising
30% to 50% of finely divided P-type semiconductor in the oxide form taken from the group consisting of palladium and rhodium, as a conductive element,
said P-type semiconductor including a cation as a dopant, the percentage of cation in the semiconductor being up to 15% by weight thereof and determinative of the resistivity of the element, said cation selected from the group consisting of antimony, chromium, lithium and sodium,
and said P-type semiconductor doped with a cation being embedded in a borosilicate glass matrix.

7. An electrical resistance element comprising
an electrically nonconducting ceramic base having fired thereon a layer of resistance composition comprising
15% to 70% of finely divided P-type semiconductor oxide taken from the group consisting of palladium oxide and rhodium oxide, as a conductive element,
said P-type semiconductor oxide including a cation as a dopant, the percentage of cation in the semiconductor being up to 15% by weight thereof and determinative of the resistivity of the element, said cation selected from the group consisting of antimony, chromium, lithium and sodium,
0% to 35% finely divided metal taken from the group consisting of silver, gold and platinum, as a conductive element,
a total of 30% to 65% as a conductive element, said conductive element embedded in a borosilicate glass matrix.

8. The method of making an electrical resistance element comprising
heating palladium metal to about 750° C. for one hour to form the semiconductor palladium oxide,
adding up to 15% by weight of the oxide a quantity of a finely divided doping compound having anions and cations palladium oxide, the cation of which is selected from the group consisting of antimony, chromium, lithium and sodium,
milling the palladium oxide and cation,
heating the mixed palladium oxide and cation to about 750° C. for an hour to permit the cation to enter the palladium oxide lattice as a dopant,
mixing the doped palladium oxide and a borosilicate glass to form a mixture,
forming said mixture into a film on an electrically nonconducting ceramic base,
heating said film to an intermediate temperature to dry the film on the base,
additionally heating said film to a high temperature about 800° C. for 20 minutes to form on the base an adherent resistance film consisting of palladium oxide doped with a cation embedded in a borosilicate glass matrix,
and cooling said base and said adherent resistive film.

9. The method of making an electrical resistance element comprising
heating palladium to about 750° C. for one hour to form the semiconductor palladium oxide,
adding to the palladium oxide a doping compound having multivalent anions and cations, the multivalent cation taken from the group consisting of antimony and chromium, the multivalent cation being up to 10% by weight of the palladium oxide,
heating the mixture of palladium oxide and multivalent cation to permit the multivalent cation to about 750° C. to enter the palladium oxide lattice as a dopant,
adding 0° to 35% finely divided metal taken from the group consisting of silver, gold and platinum to the palladium oxide doped with a multivalent cation,
forming a viscous mixture comprising an inert vehicle, 15% to 70% palladium oxide doped with the multivalent cation, 0% to 35% finely divided metal and a borosilicate glass frit,
forming said mixture into a film on an electrically nonconducting base,
heating said film to volatilize the inert vehicle,
heating said film to about 800° C. for 20 minutes to form on said base an adherent resistive film consisting of palladium oxide doped with a multivalent cation and a finely divided metal all embedded in a borosilicate glass matrix,
and cooling said base and said adherent resistive film.

10. The method of making an electrical resistance element comprising
heating finely divided palladium black in air at approximately 700° C. for one hour to form palladium oxide,
adding to the palladium oxide a doping compound having univalent anions and cations, the univalent cation taken from the group consisting of lithium and sodium, the univalent cation being up to 15% by weight of the palladium oxide,
mixing the palladium oxide and univalent cation for one hour and firing at about 800° C.,
combining 15% to 70% palladium oxide,
0% to 35% finely divided metal taken from the group consisting of gold, silver and platinum, and 35% to 70% borosilicate glass with an inert forming vehicle,
forming said combination into a film on an electrically nonconductive base,
heating said film to volatilize the inert vehicle,
additionally heating said film to a temperature of about 800° C. to form on said base an adherent resistive film consisting of palladium oxide doped with a univalent cation and silver embedded in a forosilicate glass matrix,
and cooling said base and said adherent resistive film.

11. The composition defined in claim 1 wherein a univalent cation from the group consisting of lithium and sodium, the univalent cation being in the range of up to 15% by weight of the P-type semiconductor oxide.

12. The resistors defined in claim 6 wherein a univalent cation from the group consisting of lithium and sodium is the dopant, lithium and sodium being in the range of up to 2.5% by weight of the semiconductor to provide the element with a negative temperature coefficient of resistivity.

13. The resistance element defined in claim 6 wherein a multivalent cation from the group consisting of antimony and chromium is the dopant, the multivalent cation being in the range of up to 10% by weight of the semiconductor oxide.

14. The resistance element defined in claim 6 wherein a univalent cation from the group consisting of lithium and sodium is the dopant, the univalent cation being in the range of up to 15% by weight of one semiconductor.

References Cited by the Examiner

UNITED STATES PATENTS

| | | | |
|---|---|---|---|
| 2,725,315 | 11/1955 | Fuller | 148—186 |
| 2,881,099 | 4/1959 | Langevin | 117—227 |
| 3,052,573 | 9/1962 | Duemesnil | 252—520 |

JULIUS GREENWALD, *Primary Examiner.*

J. D. WELSH, *Assistant Examiner.*